United States Patent
Hall et al.

(10) Patent No.: US 10,221,053 B2
(45) Date of Patent: Mar. 5, 2019

(54) METHODS FOR POWERING AN INTERMITTENT-DUTY CYCLE WINCH

(71) Applicants: David R. Hall, Provo, UT (US); Jerome Miles, Spanish Fork, UT (US); Daniel Madsen, Vineyard, UT (US); Benjamin Taylor, Provo, UT (US); Jedediah Knight, Provo, UT (US)

(72) Inventors: David R. Hall, Provo, UT (US); Jerome Miles, Spanish Fork, UT (US); Daniel Madsen, Vineyard, UT (US); Benjamin Taylor, Provo, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 198 days.

(21) Appl. No.: 15/340,357

(22) Filed: Nov. 1, 2016

(65) Prior Publication Data

US 2018/0118534 A1    May 3, 2018

(51) Int. Cl.
*H01R 43/00* (2006.01)
*B66D 3/26* (2006.01)
*H02J 7/00* (2006.01)

(52) U.S. Cl.
CPC .............. *B66D 3/26* (2013.01); *H02J 7/0052* (2013.01); *H02J 7/0063* (2013.01); *B66D 2700/0141* (2013.01)

(58) Field of Classification Search
CPC . B66D 3/26; B66D 2700/0141; H02J 7/0063; H02J 7/0052
See application file for complete search history.

(56) References Cited

U.S. PATENT DOCUMENTS

| | | | | |
|---|---|---|---|---|
| 5,160,286 A * | 11/1992 | Hill | ............................ | B63C 9/02 |
| | | | | 182/142 |
| 5,901,720 A * | 5/1999 | Lange | ........................ | A47L 1/02 |
| | | | | 118/307 |
| 9,604,827 B2 * | 3/2017 | Azzarelli | .................. | B66D 3/20 |
| 9,815,670 B2 * | 11/2017 | Bauder | ..................... | B66D 1/46 |
| 2005/0072965 A1 * | 4/2005 | Sanders | ................. | B66D 1/485 |
| | | | | 254/361 |
| 2016/0046469 A1 * | 2/2016 | Brady | ....................... | B66D 1/54 |
| | | | | 254/342 |
| 2018/0090953 A1 * | 3/2018 | Hall | .......................... | B66D 1/12 |

* cited by examiner

*Primary Examiner* — Paul D Kim (57) ABSTRACT

A method of powering an intermittent-duty cycle winch is disclosed. The method includes identifying a number of amp-hours required to power the winch through one duty cycle, identifying a minimum required rest period between two consecutive duty cycles, and assembling a power supply unit that powers the winch based, at least in part, on the duty cycle and the rest period. The duty cycle is mechanically or thermally limited. The power supply unit includes at least two components: a power storage unit and a charging unit that recharges the power storage unit during the rest periods. The power storage unit powers the winch through at least one duty cycle. The charging unit recharges the power storage unit during the rest period so that the power storage can power the winch through at least a second duty cycle that immediately follows the end of the minimum required rest period.

20 Claims, 8 Drawing Sheets

METHODS FOR POWERING AN INTERMITTENT-DUTY CYCLE WINCH

TECHNICAL FIELD

This invention relates generally to the field of winches and hoists, and more specifically to methods of powering winches and hoists.

BACKGROUND

The market for home storage is replete with solutions ranging from design-focused to functionality-focused, including many space-saving solutions. However, one solution for home garage storage stands out among the others for its convenience and versatile utility: motorized electronic lifters, such as MyLIFTER smart winches. These compact, powerful devices allow a user to suspend objects from a garage ceiling and conveniently and quickly store or access the objects by raising or lowering them from a synchronized smartphone app.

Despite the compact size and out-of-the way location of some motorized lifters, there is still room for improvement to ease of installation and space-saving. Currently, many motorized electronic lifters are powered via bulky AC/DC power converters plugged in to mains electricity. One solution offered to replace the power converter has been to power lifters using 18V batteries such as those used on many power tools. However, this requires that the battery be intermittently replaced so that it can be recharged, and the charging station for such batteries is typically as large or larger than the bulky AC/DC power converters they replace. Thus, there is still room for improvement in space-savings and convenience.

SUMMARY OF THE INVENTION

Methods of powering one or more winches, such as the lifters described above, are disclosed herein that overcomes some of the limitations discussed above. The methods include, generally, identifying duty cycles and rest periods required for operating the winches and assembling a power supply capable of powering the winches through at least two duty cycles and recharging during rest periods. One clear benefit of the disclosed methods is the space-savings. By quantifying the intermittent use of the winch, a power supply can be assembled that provides enough power, avoids having to exchange batteries to recharge, and reduces the footprint associated with each winch. This additionally makes it easier to install additional winches because all winches can be powered by the same power supply, instead of requiring separate power converters for each winch (as is currently required by many solutions).

In one embodiment of the present invention, a method of powering an intermittent-duty cycle winch is disclosed. The method includes identifying a number of amp-hours required to power the winch through one duty cycle, identifying a minimum required rest period between two consecutive duty cycles, and assembling a power supply unit that powers the winch based, at least in part, on the duty cycle and the rest period. The duty cycle includes paying out and winding up a line, and is mechanically, thermally, or mechanically and thermally limited. The power supply unit includes at least two components: a power storage unit and a charging unit that recharges the power storage unit during the rest periods. The power storage unit stores and provides enough Amperage to power the winch through at least one duty cycle. The charging unit recharges the power storage unit at a rapid enough rate during the rest period that the power storage unit has enough power to power the winch through at least a second duty cycle that immediately follows the end of the minimum required rest period.

In another embodiment of the present invention, a method of powering a set of intermittent-duty cycle winches is disclosed. The method includes identifying a number of amp-hours required to power each winch through one duty cycle, identifying a minimum required rest period between two consecutive duty cycles, assembling a power supply unit that powers the winches based, at least in part, on the duty cycle and the rest period, and apportioning power from the power supply unit to each winch of the set of winches based on a load borne by each winch. The duty cycle includes paying out and winding up a line, and is mechanically, thermally, or mechanically and thermally limited. The power supply unit includes at least two components: one or more power storage units and a charging unit that recharges the power storage units during the rest periods. The power storage units store and provide enough Amperage to power the winches through at least one duty cycle. The charging unit recharges the power storage units at a rapid enough rate during the rest period that the power storage units have enough power to power the winches through at least a second duty cycle.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch +/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
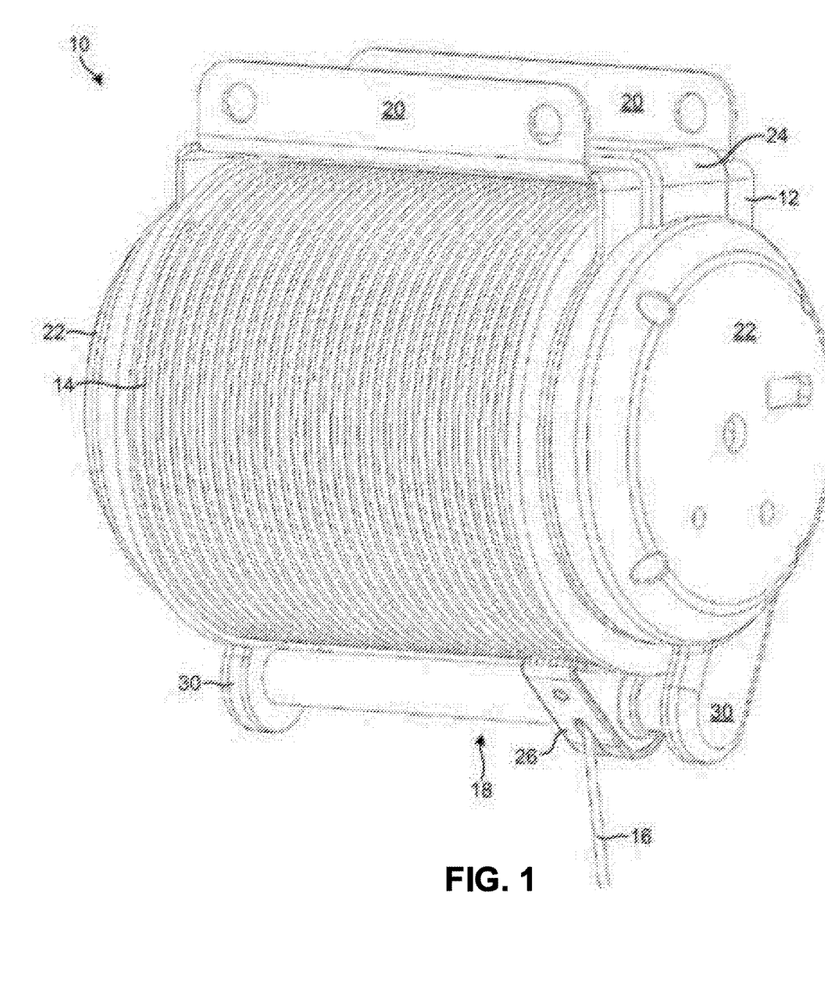
FIG. 1 depicts a perspective view showing one embodiment of a motorized lifting device in accordance with the claimed invention.

FIG. 1 depicts a perspective view showing one embodiment of a motorized lifting device 10 in accordance with the claimed invention. Although motorized lifting device 10 is described herein primarily as it relates to lifting objects, in some embodiments, device 10 is also used to pull loads in the manner of conventional winches. Thus, nothing in this disclosure should be interpreted as indicating that motorized lifting device 10 is only suitable for lifting. Many of the features and functions described herein related to lifting are equally beneficial to pulling loads. Motorized lifting device 10 addresses a multitude of different shortcomings of the prior art, such as problems with bulkiness, precision, and control. Such improvements additionally create new applications for hoists or winches, or make hoists or winches more economically or practically feasible for existing applications. The illustrated motorized lifting device 10 is compact relative to other devices with similar capability and function, and has features to provide improved precision and control. In some respects, the precision and control of motorized lifting device 10 is similar to the precision and control provided by modern-day computer numerical control (CNC) machine tools. For example, the features and functions of motorized lifting device 10 make it possible to know at all times where the end of the line is, or position the end of the line at a desired location. This capability also enables a wide variety of other features and functions.

FIG. 1 provides an external view of one embodiment of a motorized lifting device according to the claimed invention. Many internal features are hidden from view, including a motor and transmission disposed within motorized lifting device 10. As shown in FIG. 1, motorized lifting device 10 includes frame 12, drum 14 for letting out or drawing in a line 16, and passive guiding mechanism 18 for guiding line 16 onto or off of drum 14. In the illustrated embodiment, drum 14 is grooved. That is, drum 14 includes a continuous groove (e.g. a helical groove) around a circumference thereof. This allows drum 14 to receive and retain line 16 in the groove. Drum 14 is rotated by a motor and transmission (not shown), which in the illustrated embodiments are substantially entirely contained within drum 14. This makes motorized lifting device 10 very compact and expands a number of applications for device 10.

Other details of FIG. 1 are worth noting. As shown in FIG. 1, frame 12 of motorized lifting device 10 includes a pair of flanges 20. Flanges 20 enable, in some embodiments, motorized lifting device 10 to be quickly and easily connected to a bracket (not shown) with pins, bolts, or other fasteners. Such a bracket is, in some embodiments, attached to a ceiling joist, wall stud, or other structural member, as will be explained in more detail in association with FIG. 2. In some cases, flanges 20 also allow motorized lifting device 10 to be quickly and easily removed or attached to another bracket in a different location. Thus, motorized lifting device 10 is, in some embodiments, configured for quick and easy attachment and removal from ceilings, walls, or the like.

As shown, motorized lifting device 10 includes cover plates 22 at each end. In certain embodiments, cover plates 22 cover electronics located at the ends of motorized lifting device 10. For example, logistics electronics are, in some embodiments, mounted at or near a first end of motorized lifting device 10 and power electronics are mounted at or near a second end of motorized lifting device 10. In various embodiments, the logistics electronics include, for example, lower power electronics such as data processing microelectronics or communication electronics that enable data and commands to be communicated to motorized lifting device 10 from an external location. Similarly, the power electronics include higher power electronics to receive power and drive the motor. Placing the logistics electronics and power electronics on separate ends of the motorized lifting device 10 prevents noise generated by the power electronics from interfering with operation of the logistics electronics. In certain embodiments, power and/or data cable 24, such as a ribbon cable, is routed across a top of frame 12 to enable power and/or data to be communicated between the logistics electronics and the power electronics.

As shown, passive guiding mechanism 18 guides line 16 into the groove of drum 14. Passive guiding mechanism 18 includes, in various embodiments, passive guide 26 that moves along slide 28 approximately perpendicular to the groove. In certain embodiments, slide 28 is retained by a pair of arms 30 that extend from motorized lifting device 10. Passive guide 26 includes, in some embodiments, one or more teeth that ride in—and track—the groove as drum 14 rotates. When drum 14 rotates in a first direction, passive guide 26 guides line 16 into the groove. When drum 14 rotates in an opposite direction, passive guide 26 guides line 16 out of the groove. Passive guide 26 is referred to as passive because no additional power source is needed to move passive guide 26 along slide 28. Rotation of drum 14, combined with tracking of the groove, is sufficient to move passive guide 26 along slide 28 and guide line 16 into or out of the groove.

Figure 2:
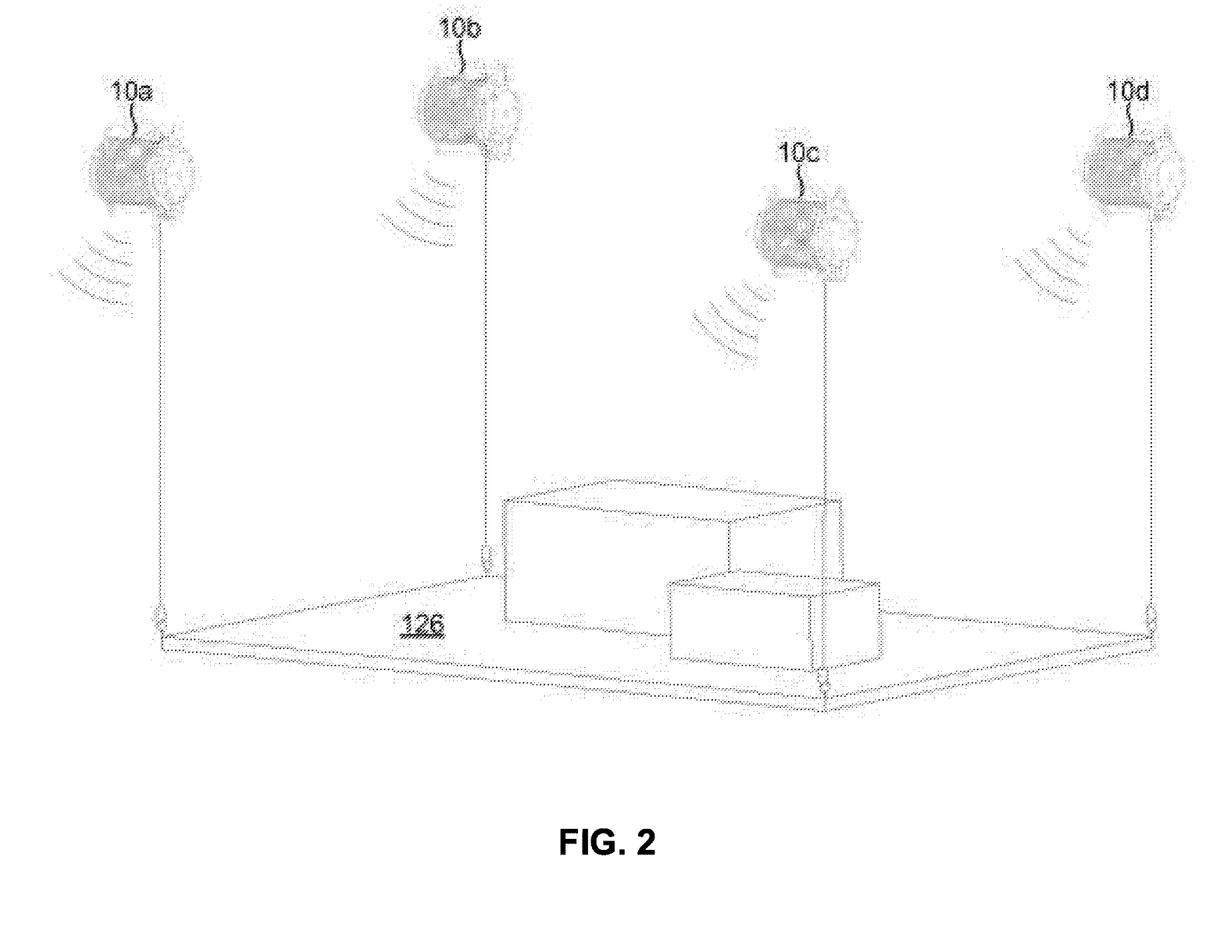
FIG. 2 depicts several winches lifting a shared load, according to the claimed invention.

Referring to FIG. 2: in certain embodiments, it is desirable to have multiple motorized lifting devices 10 operate in a synchronized manner. For example, multiple motorized lifting devices 10a-d are, in some embodiments, arranged and synchronized to lift a shared load, such as platform 126. When using multiple synchronizing motorized lifting devices 10 to lift a shared load, apparatus and methods are needed to ensure that the motorized lifting devices 10 stay synchronized. For example, if one motorized lifting device 10 were to stop while the other motorized lifting devices 10 continued lifting or lowering a load, the platform 126 could tip, potentially spilling items or creating a safety hazard. A similar situation could occur if some motorized lifting devices 10 were to move faster or slower than others. For example, in cases where a load is distributed unevenly among motorized lifting devices 10, some motorized lifting devices 10 would move faster or slower than others if the imbalance is not accounted for, potentially causing platform 126 to tip.

In certain embodiments a grouping module is used to group motorized lifting devices 10 for synchronized operation, and/or a synchronization module is used to keep the group of motorized lifting devices 10 synchronized with one another. Once grouped, motorized lifting devices 10 operate as a single device. For example, in some embodiments, a single button press on a remote controller causes all motorized lifting devices 10 in the group to operate in a synchronized manner, such as by lifting or lowering a load.

In some embodiments, the grouping module and synchronization module are implemented in the remote controller. In other embodiments, the grouping module or synchronization module is implemented in motorized lifting devices 10 and/or distributed between the remote controller and motorized lifting devices 10. In general, the synchronization module monitors operating parameters, such as position of the line, and speed, of motorized lifting devices 10 in the group and/or adjusts the operating parameters to keep motorized lifting devices 10 synchronized to within a predetermined tolerance. Such a tolerance ranges from 0.1% to 0.5% or 0.5% to 1% in various embodiments.

Figure 3:
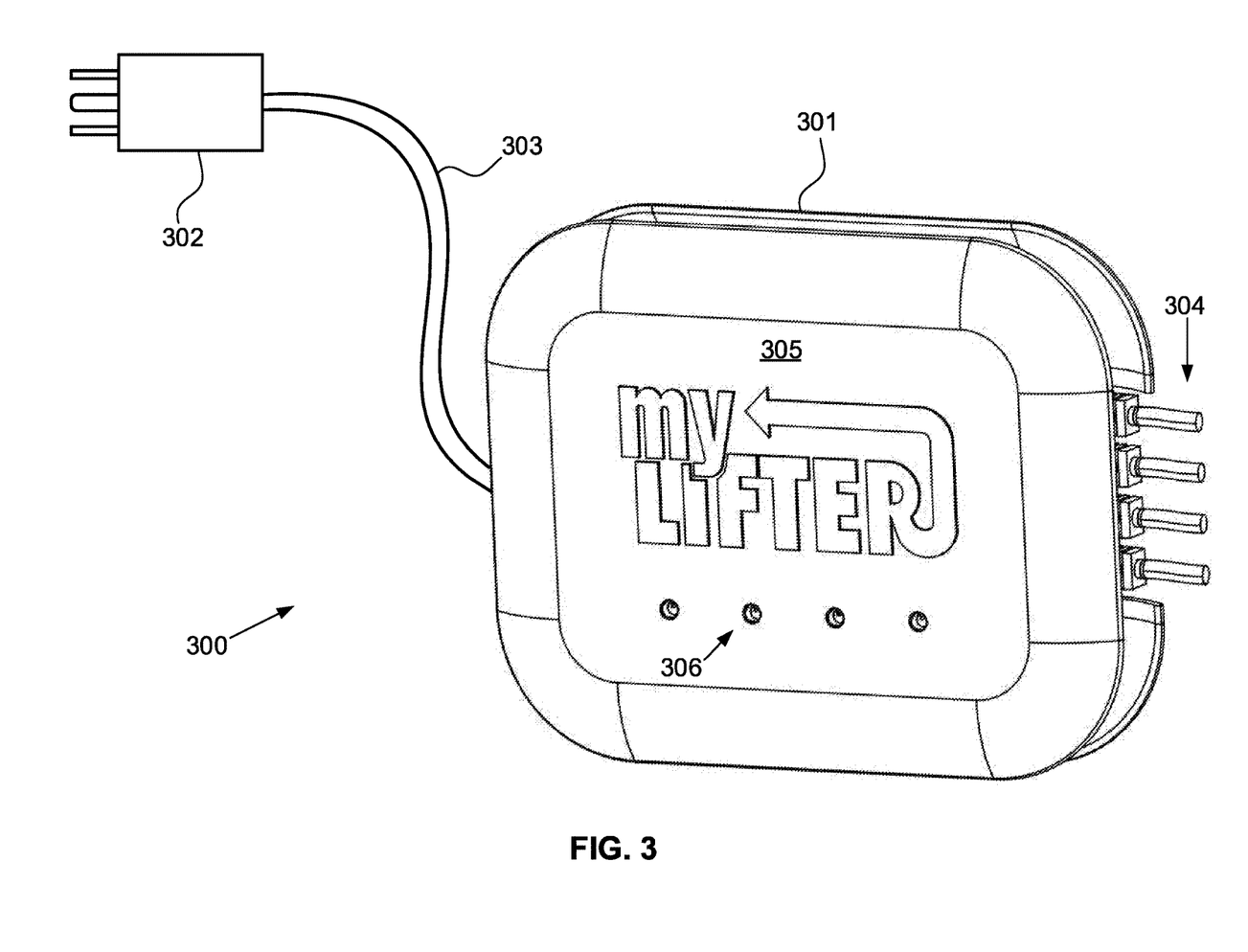
FIG. 3 depicts one embodiment of a power supply unit for a motorized lifting device according to the claimed invention.

FIG. 3 depicts one embodiment of a power supply unit for a motorized lifting device according to the claimed invention. Power supply unit 300 includes power storage unit 301 and charging unit 302. Power storage unit 301 is electrically coupled to charging unit 302 via charging cable 303, and is electrically coupled to one or more winches, such as the motorized lifting devices described above regarding FIGS. 1-2, via power cords 304. Power storage unit 301 stores and provides enough Amperage to power the winch/es through at least one duty cycle. In turn, charging unit 302 recharges power storage unit 301 at a rapid enough rate during a rest period between duty cycles that power storage unit 301 has enough power to power the winch/es through at least a second duty cycle.

As depicted, power storage unit 301 includes housing 305 (also described in more detail below regarding FIG. 4) and indicator lights 306. Housing 305 stores one or more batteries that store energy for powering the winch/es. Indicator lights 306 are electrically coupled to the batteries via, for example, a hardware controller. The hardware controller includes firmware reads the power level of the batteries and provides an indication of the power level to a user via, in the depicted embodiment, indicator lights 306. For example, in one embodiment, the batteries are all on the same circuit, and a number of indicator lights 306 lit concurrently indicate to the user the power level of the batteries, i.e., in the case of four indicator lights 306, all lights 306 lit represent 87.5% to 100% capacity, three of four lights 306 lit represent 62.5% to less than 87.5% capacity, two of four lights 306 lit represent 37.5% to less than 62.5% capacity, one of four lights 306 lit represent 12.5% to less than 37.5% capacity, one of four lights 306 blinking represents more than 0% to less than 12.5% capacity, and no lights 306 lit represents 0% capacity. In some such embodiments, lights 306 remain lit, even when power storage unit 301 is not receiving power from charging unit 302. In other embodiments, lights 306 turn off to conserve power when power storage unit 301 is not receiving power from charging unit 302. Alternatively, in some embodiments, each light 306 represents a power level of one battery, such as by changing color, blinking, and/or turning off.

Charging unit 302 is, in the depicted embodiment, an AC to DC power converter. Charging unit 302 electrically couples power storage unit 301 to mains electricity and recharges power storage unit 301 at least during rest periods between duty cycles. In some embodiments, charging unit 302 charges power storage unit 301 as power storage unit 301 powers the winch/es. In such embodiments, however, charging unit 302 charges power storage unit 301 at a slower rate than power storage unit provides power to the winch/es. This has a number of benefits. First, as described above, power storage unit 301 stores enough power to power the winch/es through at least one duty cycle (which is described in more detail below regarding FIG. 5). In many winch applications, such as in home storage applications, a user only employs the winch for one to two duty cycles, at most, in a relatively short period time. For example, in some home storage uses, a winch will be lowered and then raised, and will remain raised, and unoperated, for hours, days, weeks, months, and even years. In such embodiments, it is only necessary to provide the winch with enough power to lower and raise the line. To save space, energy is more efficiently stored in, for example, batteries that directly power the winch/es rather than powering the winch/es through an AC to DC power adapter coupling the winch/es to mains electricity. For example, a 5 Amp-hour, 12 Volt battery is approximately ½ to ⅓ the size of an equivalent 110/240 V power converter. The space savings increase with additional winches. For example, a 20 Amp-hour, 12 volt battery is approximately ¼ the size of an equivalent power converter.

One issue with replacing a power converter with a battery is that, eventually, all batteries either need to be replaced or recharged. For example, in some embodiments, and depending on the weight of the load being moved by the winch/es, power storage unit 301 stores and provides enough power to power the winch/es through up to 2 duty cycles without recharging between duty cycles, at least 20 duty cycles and not more than 30 duty cycles without recharging between duty cycles, at least 10 duty cycles and not more than 20 duty cycles without recharging between duty cycles, or at least 23 and not more than 24 duty cycles without recharging. However, the case described above is unique in that there is typically a significant amount of time between uses of the winch/es, and therefore a significant amount of time available for recharging the batteries. Thus, the batteries can be recharged at, for example, a 1.5 Amp-hour rate, or even a fraction of an Amp-hour rate, thereby significantly reducing the necessary size of the power converter. For example, in various embodiments of the present invention, the power storage unit charge rate to discharge rate ratio ranges from 1:1.1 to 1:10, 1:10 to 1:20, 1:20 to 1:30, 1:30 to 1:40, 1:40 to 1:50, 1:50 to 1:60, 1:60 to 1:70, 1:70 to 1:80, 1:80 to 1:90, or 1:90 to 1:100.

In every other application of batteries, recharging focuses on either rapid recharging or extending battery duty cycle length through trickle charging. However, the present inventors are not aware of any solutions presented where a device's battery beneficially and intentionally relies on slow recharging. Indeed, the current art teaches the exact opposite: rapid recharging and battery life extension through trickle charging. The present invention, however, is unique in that, because the winch/es typically have long periods of non-operation (not to be confused with minimum required rest periods, discussed below in more detail), the power converter, such as charging unit 302, is significantly smaller than the batteries, such as in power storage unit 301. The combination of power storage unit 301 and charging unit 302 is a fraction of the size of an equivalent power converter directly powering the winch/es via mains electricity.

Charging cable 303 electrically couples charging unit 302 to power storage unit 301, in some cases even as power storage unit 301 provides power to the winch/es. Charging cable 303 comprises sufficiently-sized conductive wiring to deliver the current corresponding to the current rating of charging unit 302. Additionally, charging cable 303 includes insulating material surrounding the conductive wiring. In some embodiments, charging cable 303 also includes one or more logic wires that transmit data between charging unit 302 and power storage unit 301.

Power cords 304 are constructed similarly to charging cable 303, except that the conductive wiring in power cords 304 is sufficient to carry the current required to power the winch/es. Thus, the conductive wiring of power cords 304 have a higher minimum-required gauge than the charging cable conductive wiring. In some embodiments, a single power cord 304 provides power to multiple winches, such as in embodiments where the winches are daisy chained in parallel (similar to that described above regarding FIG. 2). Daisy-chaining winches also provides the added benefit of enabling throttling of the current delivered to a particular winch. However, in other embodiments, such as the depicted embodiment, separate power cords 304 are provided for each winch. In some such embodiments, each power cord is coupled to a separate battery. In yet other embodiments, each power cord is coupled to the full bank of batteries, and hardware and/or software throttles the current delivered to each battery.

Housing 305 provides structural support for the internal components of power storage unit 301, including batteries, a PCB, indicator lights 306, and input ports for charging cable 303 and power cords 304. For example, in embodiments similar to the depicted embodiment, housing 305 includes one or more indicator light openings, one or more power input openings, and one or more power output openings. Power storage unit 301 electrically couples to charging unit 302 through the power input opening/s, and electrically couples to the winch/es through the power output opening/s.

Figure 4:
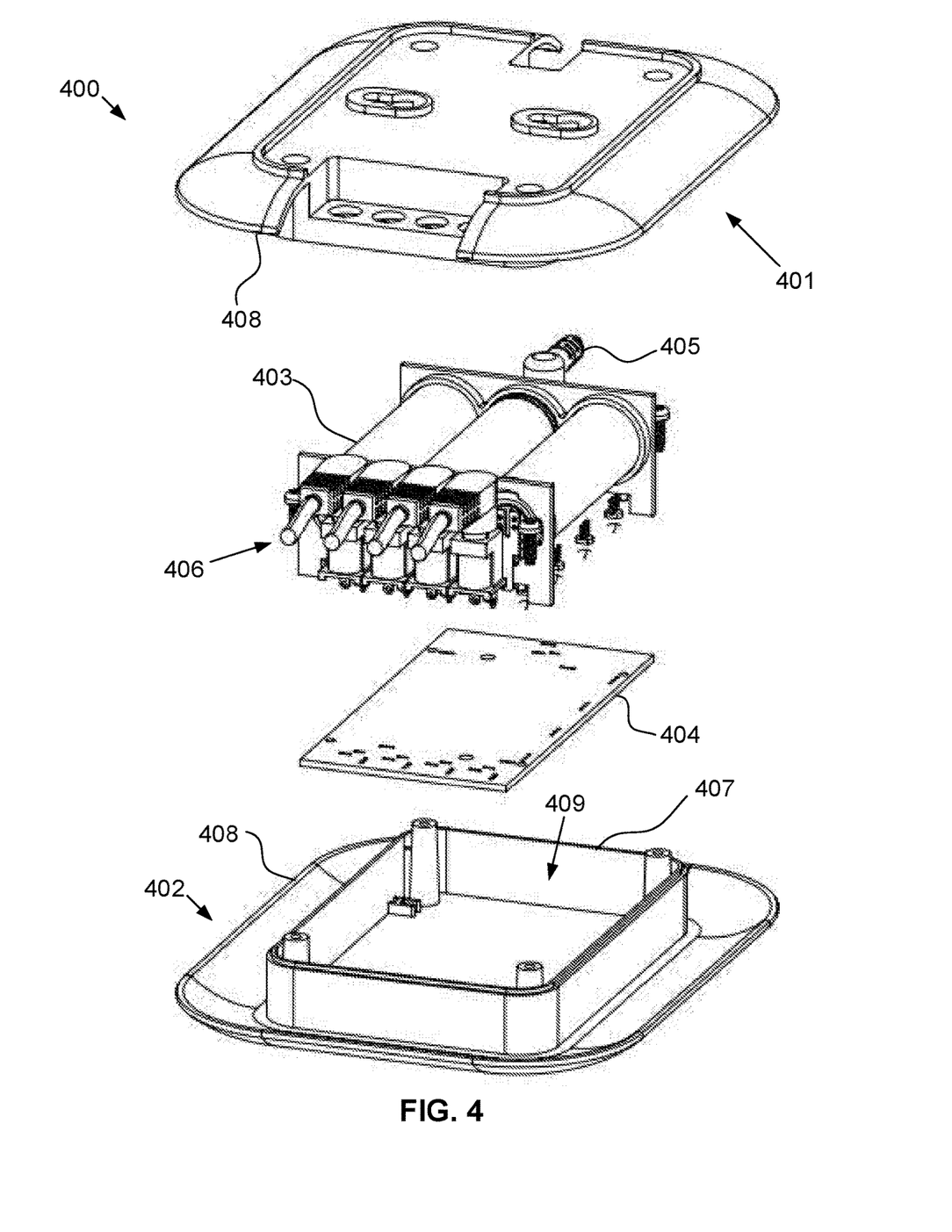
FIG. 4 depicts an exploded view of a power storage unit similar to that described above regarding FIG. 3, and in accordance with the present invention.

FIG. 4 depicts an exploded view of a power storage unit similar to that described above regarding FIG. 3, and in accordance with the present invention. Power storage unit 400 includes top portion 401, bottom portion 402, batteries 403, printed circuit board 404, charging cable 405, and power cords 406.

Top portion 401 and bottom portion 402 each include protruding lip 407 and flange 408. Top and bottom protruding lips 407 come together to form cavity 409 between top and bottom portion 401, 402. Batteries 403 and PCB 404 are supported within cavity 409. Flanges 408 form a space between top portion 401 and bottom portion 402 around cavity 409. Charging cable 405 and/or power cords 406 wrap around protruding lips 407 between flanges 408.

As depicted, power storage unit 400 includes three batteries of approximately six and two-thirds Amp-hours each. However, the power supplied by the batteries varies depending on the specific embodiment. For example, in various embodiments, each battery ranges from 1 Amp-hour to 3 Amp-hours, from 3 Amp-hours to 5 Amp-hours, from 5 Amp-hours to 7 Amp-hours, or from 7 Amp-hours to 10 Amp-hours.

PCB 404 supports circuitry the electrically couples the batteries to one or more hardware processors and/or hardware memory, the charging unit, and the winch/es. In some embodiments, PCB 404 includes one or more hardware and/or software (stored in the memory and executed by the processors) switches that switch power storage unit 400 between a charge mode and a power mode. In other embodiments, PCB 404 includes hardware and/or software that adds the current being provided from the charging unit to that being provided by batteries 403 to the winch/es.

Figure 5:
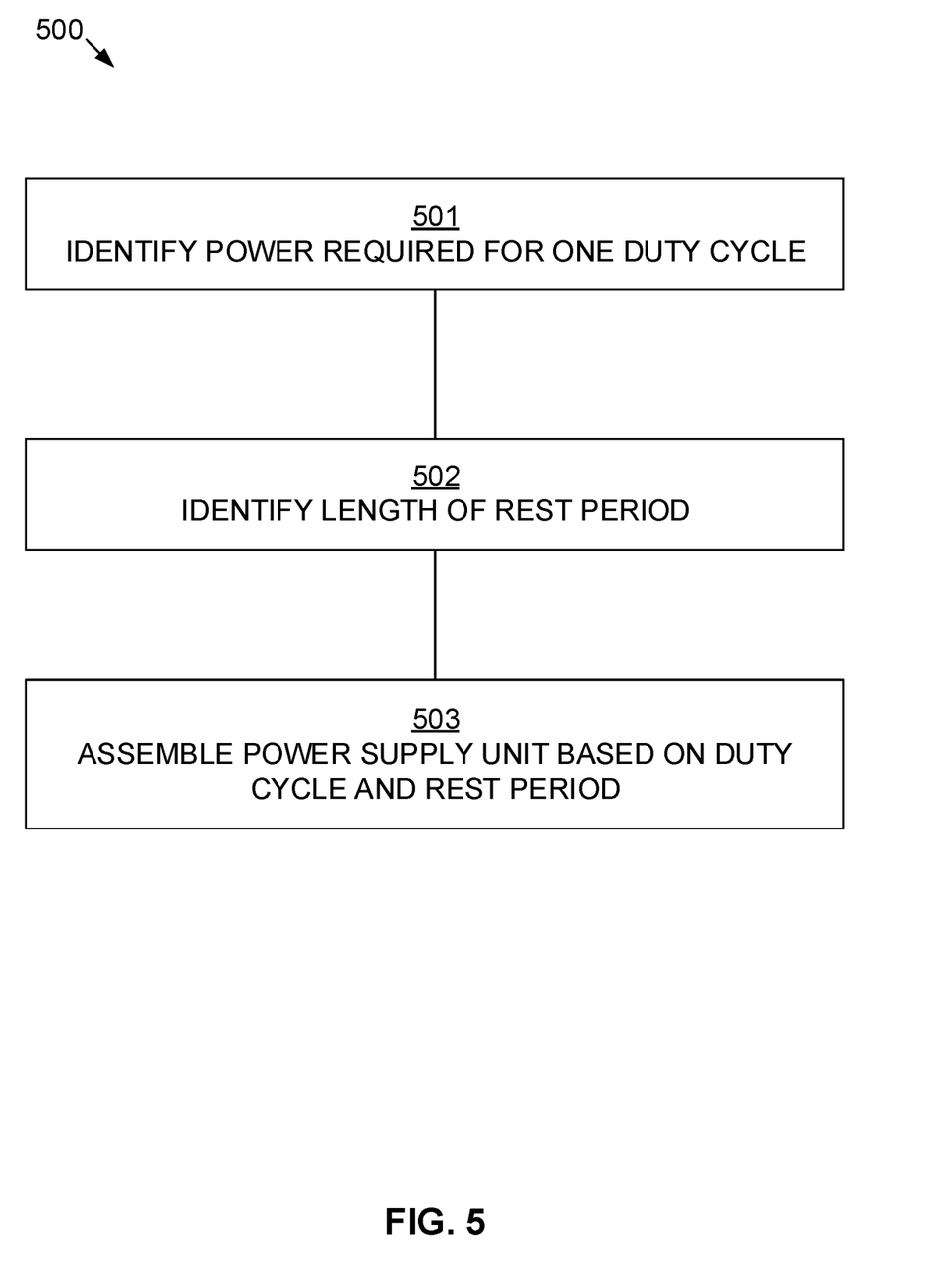
FIG. 5 depicts one embodiment of a method for powering an intermittent-duty cycle winch or set of intermittent-duty cycle winches (such as those described above regarding FIGS. 1-2), in accordance with the claimed invention.

FIG. 5 depicts one embodiment of a method for powering an intermittent-duty cycle winch or set of intermittent-duty cycle winches (such as those described above regarding FIGS. 1-2), in accordance with the claimed invention. Method 500 includes, at block 501, identifying a number of amp-hours required to power the winch or set of winches through one duty cycle. At block 502, method 500 includes identifying a minimum rest period required between two consecutive duty cycles, and at block 503, method 500 includes assembling a power supply unit that powers the winch or winches, according to the determined duty cycle and required rest period.

One duty cycle of the winch/es includes, in various embodiments, operation of the winch/es until the winch/es reach an operational limit. An operational limit includes a thermal limit, a mechanical limit, or a mechanical and thermal limit. An example of a thermal limitation is a motor temperature, above which the winch motor is inoperable and/or sustains damage. In some embodiments, the thermal limit is artificially set by, for example, a controller (such as the processors described above with regard to FIG. 4), below the absolute motor thermal limit to prevent damage to the motor. In other embodiments, the winch is indirectly thermally limited by, for example, a mechanical limitation. Such a limitation occurs, for example, in embodiments where various moving components of the winch, such as the gears, are made of a material that deforms at temperatures the components are likely to reach during operation of the winch. It is beneficial to construct the winch/es of such materials, for example, to make the winch/es lightweight and/or inexpensive. Any components used must have tight tolerances with little play in the gears to ensure efficient and enduring operation of the winch/es. Expansion and/or deformation of any component therefore causes the winch/es to become inoperable without potentially irreparably damaging the winch/es. However, the expanded parts cool as the winch/es rest, and return to an operable state during the rest period.

Some winch, hoist, or motorized lifter designs include means to cool internal components such as the motor. In the presently disclosed embodiments, however, such means are limited to vents on either side of the drum of each winch. Other means of cooling are excluded to allow for compact design of the motorized lifter. This is also beneficial because the lifter is unlikely to be used so extensively that it reaches its duty-cycle limit, which is also the reason the powering methods described herein are possible for the presently disclosed winches and not others.

In general, a single duty cycle includes a number of operational sets, which include paying out the line completely and winding the line complete up. Various embodiments of a duty cycle according to the claimed invention include at least 1 and no more than 10 operation sets, at least 1 and no more than 5 operation sets, at least 1 and no more than 3 operation sets, at least 2 and no more than 3 operation sets, or at least 1 and no more than 2 operation sets.

The rest period discussed above is a minimum amount of time required for the winch/es to rest before being operated, becoming operable, or both. Thus, it is distinct from the period of non-operation described above. For example, the rest period may be required for the winch motor/s or various other components to cool and/or contract back to an operable state. The minimum rest period varies depending on the specific embodiments, for example ranging from 3 to 10 minutes, 1 to 7 minutes, or 5 to 12 minutes.

One convenient aspect of many embodiments of the present invention is that the power storage unit does not need to be disconnected from the charging unit to recharge the batteries. Rather, in some embodiments, assembling the power supply unit includes electrically coupling the power storage unit to the charging unit such that the charging unit is electrically coupled to the power storage unit as the power storage unit provides power to the winch.

Figure 6:
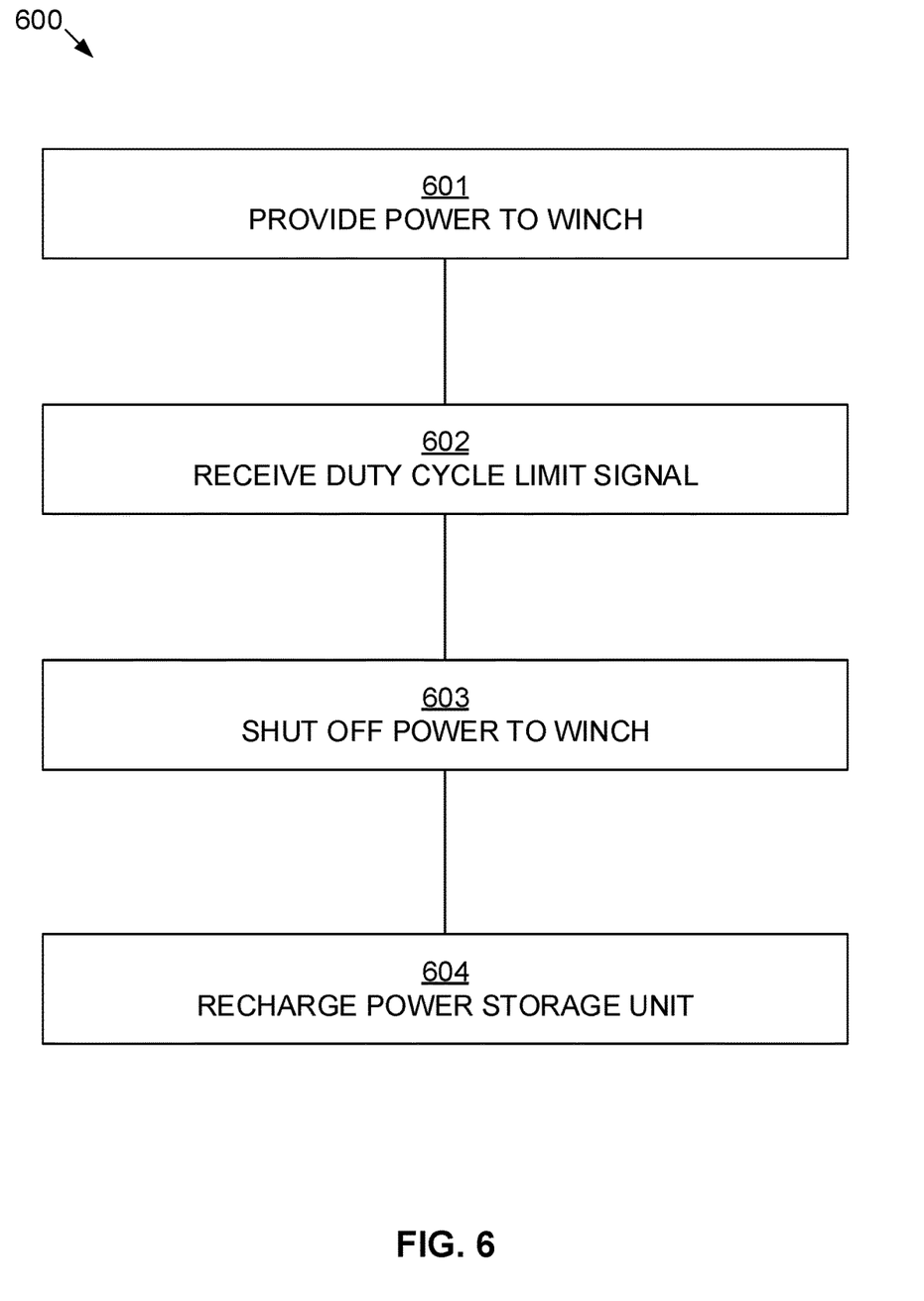
FIG. 6 depicts various steps in one embodiment of a method of powering an intermittent-duty cycle winch or set of intermittent-duty cycle winches according to the claimed invention.

FIG. 6 depicts various steps in one embodiment of a method of powering an intermittent-duty cycle winch or set of intermittent-duty cycle winches according to the claimed invention. As described above, in some embodiments, one or more hardware computer processors and/or hardware memory are included that control delivery of power from the power supply unit to the winch. In some such embodiments, the memory stores instructions for delivering power from the power supply unit to the winch, depicted in FIG. 6 as method 600. At block 601, method 600 includes instructions for providing power to the winch. At block 602, a signal is received from the winch indicating the winch has reached its duty cycle limit. At block 603, power is shut off to the winch. At block 604, power to the power storage unit and from the charging unit is switched on, and the charging unit recharges the power storage unit during the rest period. In some embodiments, though not depicted, method 600 includes receiving a second signal from the winch indicated the rest period is complete, and automatically providing power to the winch again.

Figure 7:
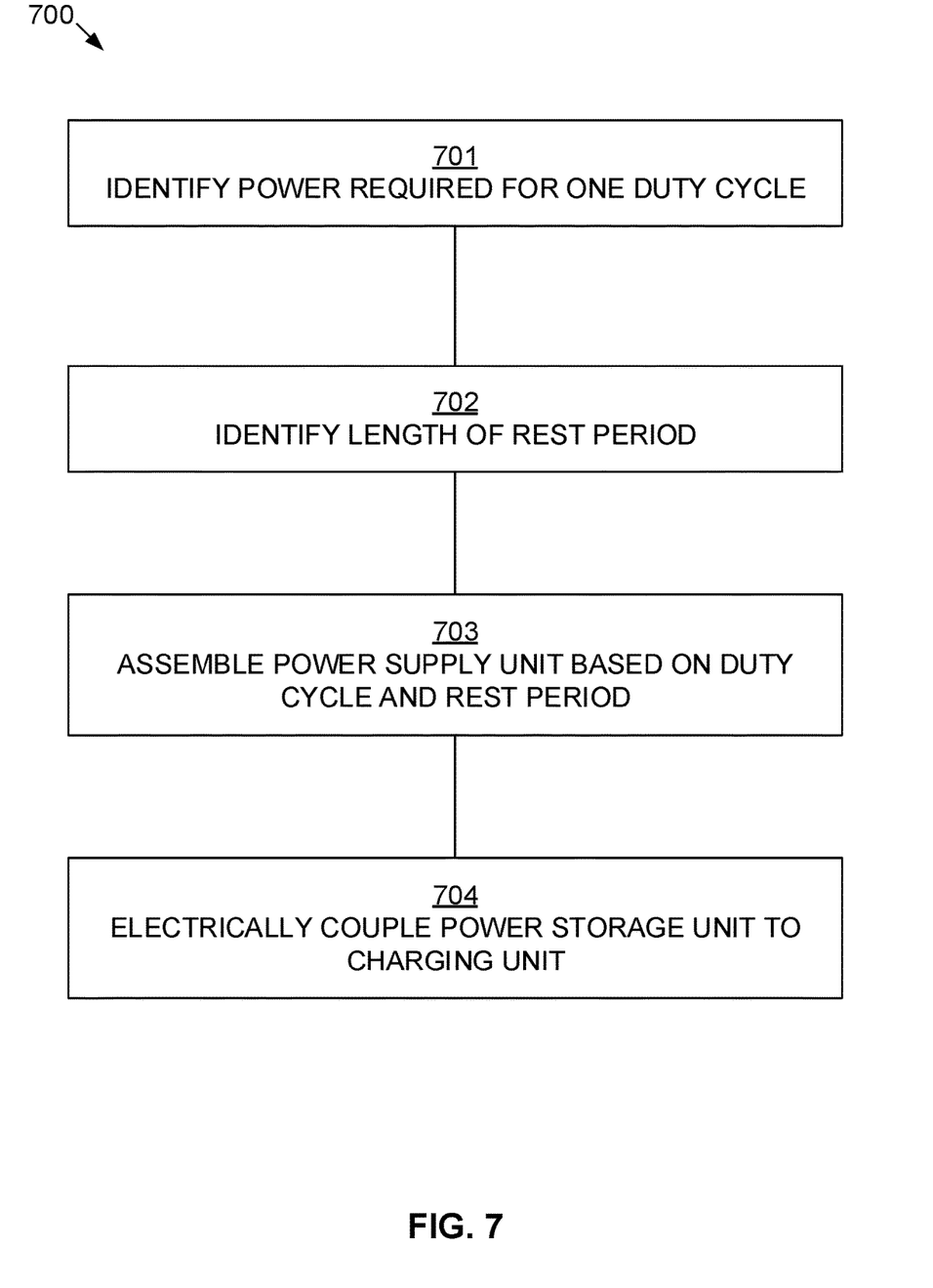
FIG. 7 depicts a method of powering an intermittent-duty cycle winch or set of intermittent-duty cycle winches according to the claimed invention.

FIG. 7 depicts a method of powering an intermittent-duty cycle winch or set of intermittent-duty cycle winches according to the present invention, and similar to that described above regarding FIG. 5. Method 700 includes, at block 701, identifying a number of amp-hours required to power the winch or set of winches through one duty cycle. At block 702, method 700 includes identifying a minimum rest period required between two consecutive duty cycles, and at block 703, method 700 includes assembling a power supply unit that powers the winch or winches, according to the determined duty cycle and required rest period. At block 704, method 700 includes electrically coupling the power storage unit to the charging unit such that the power storage unit provides power to the winch/es as the charging unit provides power to the power storage unit.

Figure 8:
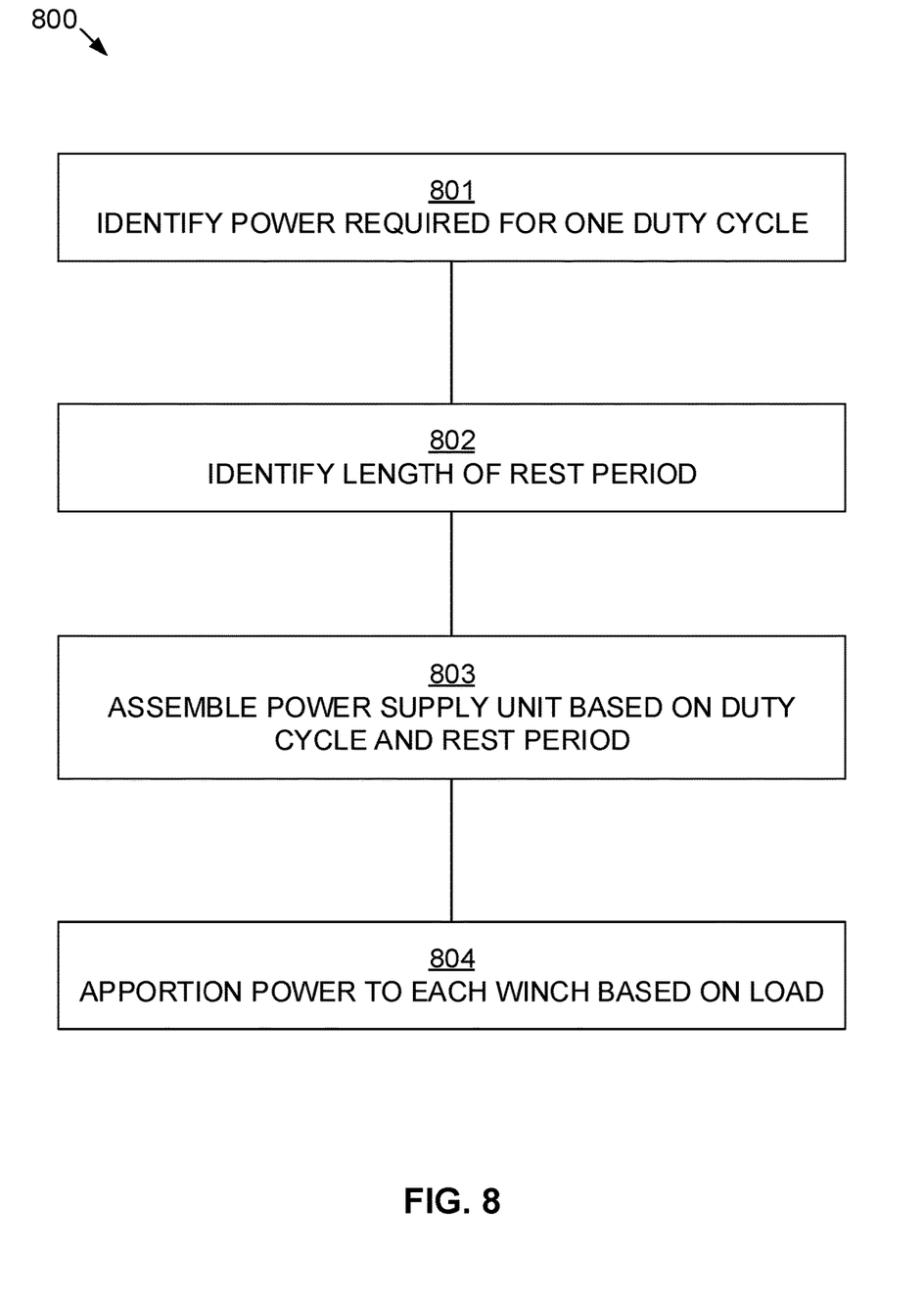
FIG. 8 depicts embodiment of a method of powering a set of intermittent-duty cycle winches according to the claimed invention.

FIG. 8 depicts an embodiment of a method of powering a set of intermittent-duty cycle winches according to the present invention. As described throughout, various embodiments of the present invention include several winches. In some such embodiments, the power supply unit includes separate power storage units for each winch. Each power storage unit is electrically coupled to its corresponding winch separate from each other power storage unit and the corresponding winches. Method 800 depicts a powering method in some such embodiments, or, alternatively, in embodiments where there is one power storage unit for all winches. Method 800 includes, at block 801, identifying a number of amp-hours required to power the winch or set of winches through one duty cycle. At block 802, method 800 includes identifying a minimum rest period required between two consecutive duty cycles, and at block 803, method 800 includes assembling a power supply unit that powers the winch or winches, according to the determined duty cycle and requires rest period. At block 804, method 800 includes apportioning power from the power supply unit to each winch based on a load borne by each winch. In some embodiments, this would require different-sized batteries for each winch based on an anticipated maximum load for each winch, while still operating each winch synchronously. In other embodiments, the power storage units are electrically coupled in parallel, and one or more hardware controllers are used to apportion power to each winch based on, for example, an input load portion for each winch.

We claim:

1. A method of powering an intermittent-duty cycle winch, comprising:
    identifying a number of amp-hours required to power the winch though one duty cycle, wherein the duty cycle comprises paying out and winding up a line, and wherein the duty cycle is mechanically limited, thermally limited, or both;
    identifying a minimum required rest period required between two consecutive duty cycles;
    assembling a power supply unit that powers the winch, the power supply comprising:
        a power storage unit; and
        a charging unit that recharges the power storage unit during the rest periods,
    wherein the power storage unit stores and provides enough Amperage to power the winch through at least one duty cycle, and wherein the charging unit recharges the power storage unit at a rapid enough rate during the rest period that the power storage unit has enough power to power the winch through at least a second duty cycle.

2. The method of claim 1, wherein continuously paying the line completely out and winding the line completely up comprises a winch operation set.

3. The method of claim 2, wherein the duty cycle comprises at least 1 and no more than 10 operation sets.

4. The method of claim 1, wherein the rest period ranges from 3 to 10 minutes, 1 to 7 minutes, or 5 to 12 minutes.

5. The method of claim 1, wherein the power storage unit comprises one or more batteries.

6. The method of claim 5, wherein the one or more batteries range from 1 Amp-hour to 3 Amp-hours.

7. The method of claim 1, wherein the power supply unit comprises a two-piece housing having one or more indicator light openings, one or more power input openings, and one or more power output openings.

8. The method of claim 7, wherein the housing comprises two flanges and a space between the flanges around the housing, wherein a power cord from the charging unit to the power storage unit wraps around the housing in the space between the flanges.

9. The method of claim 1, wherein a length of the duty cycle depends directly on the weight of the load being moved by the winch.

10. The method of claim 1, wherein the power storage unit stores and provides enough power to power the winch through up to 2 duty cycles without recharging between duty cycles, at least 20 duty cycles and not more than 30 duty cycles without recharging between duty cycles, at least 10 duty cycles and not more than 20 duty cycles without recharging between duty cycles, or at least 23 and not more than 24 duty cycles without recharging.

11. The method of claim 1, wherein the charging unit charges the power storage unit as the power storage unit powers the winch, wherein the charging unit charges the power storage unit at a slower rate than the power storage unit provides power to the winch.

12. The method of claim 11, wherein a power storage unit charge rate to discharge rate ratio ranges from 1:90 to 1:100.

13. The method of claim 1, wherein the power supply unit further comprises one or more hardware computer processors and hardware memory, wherein the one or more processors control delivery of power from the power supply unit to the winch, and wherein the memory stores instructions for delivering power from the power supply unit to the winch.

14. The method of claim 13, wherein the instructions comprise:
providing power to the winch;
receiving a signal from the winch indicating the winch has reached its duty cycle limit;
shutting off power to the winch; and
switching on power to the power storage unit from the charging unit, wherein the charging unit recharges the power storage unit during the rest period.

15. The method of claim 1, wherein assembling the power supply unit comprises electrically coupling the power storage unit to the charging unit such that the charging unit is electrically coupled to the power storage unit as the power storage unit provides power to the winch.

16. The method of claim 1, wherein the thermal limitation comprises a maximum temperature of a motor that powers the winch, above which temperature the winch is made inoperable.

17. The method of claim 1, wherein the mechanical limitation comprises a deformation of a mechanical part of the winch, and wherein the deformed mechanical part returns to an operable state during the rest period.

18. A method of powering a set of intermittent-duty cycle winches, comprising:
identifying a number of amp-hours required to power each winch though one duty cycle, wherein the duty cycle comprises paying out and winding up, in concert, lines associated with each winch, and wherein the duty cycle is mechanically limited, thermally limited, or both;
identifying a minimum required rest period required between two consecutive duty cycles;
assembling a power supply unit that powers the winches, the power supply comprising:
one or more power storage unit; and
a charging unit that recharges the power storage unit during the rest periods,
wherein the power storage units store and provide enough Amperage to power the winches through at least one duty cycle, and wherein the charging unit recharges the power storage units at a rapid enough rate during the rest period that the power storage units have enough power to power the winches through at least a second duty cycle; and
apportioning power from the power supply unit to each winch based on a load borne by each winch.

19. The method of claim 18, wherein the winches are daisy-chained in parallel.

20. The method of claim 18, the power supply unit comprising separate power storage units for each winch, wherein each power storage unit is electrically coupled to its corresponding winch separate from each other power storage unit and their corresponding winches, and wherein assembling the power supply unit comprises electrically coupling each power storage unit to the charging unit such that the charging unit is electrically coupled to each power storage unit as each power storage unit provides power to each corresponding winch.

* * * * *